United States Patent
Narasimhan et al.

(10) Patent No.: US 10,345,112 B2
(45) Date of Patent: Jul. 9, 2019

(54) COMPUTER IMPLEMENTED INTERACTIVE SYSTEM AND METHOD FOR LOCATING PRODUCTS AND SERVICES

(71) Applicant: ZENSAR TECHNOLOGIES LIMITED, Pune, Maharashtra (IN)

(72) Inventors: Mukund Narasimhan, Pune (IN); Udit Chandna, Delhi (IN); Madhuri Sadashiv Disale, Pune (IN); Devang Pinakin Pandya, Pune (IN)

(73) Assignee: Zensar Technologies Ltd., Pune, MA (US)

( * ) Notice: Subject to any disclaimer, the term of this patent is extended or adjusted under 35 U.S.C. 154(b) by 102 days.

(21) Appl. No.: 15/651,242

(22) Filed: Jul. 17, 2017

(65) Prior Publication Data
US 2018/0080784 A1 Mar. 22, 2018

Related U.S. Application Data

(60) Provisional application No. 62/419,584, filed on Nov. 9, 2016.

(30) Foreign Application Priority Data

Sep. 22, 2016 (IN) .............................. 201621032411

(51) Int. Cl.
| | | |
|---|---|---|
| *G01C 21/34* | (2006.01) | |
| *G06F 16/29* | (2019.01) | |
| *G06F 16/2452* | (2019.01) | |
| *G06Q 30/02* | (2012.01) | |
| *G01C 21/20* | (2006.01) | |
| *H04W 4/02* | (2018.01) | |
| *G06Q 30/06* | (2012.01) | |
| *H04L 29/08* | (2006.01) | |

(52) U.S. Cl.
CPC ......... *G01C 21/3476* (2013.01); *G01C 21/20* (2013.01); *G01C 21/3484* (2013.01); *G06F 16/24522* (2019.01); *G06F 16/29* (2019.01); *G06Q 30/0255* (2013.01); *G06Q 30/0259* (2013.01); *G06Q 30/0631* (2013.01); *H04L 67/18* (2013.01); *H04W 4/02* (2013.01)

(58) Field of Classification Search
None
See application file for complete search history.

(56) References Cited

U.S. PATENT DOCUMENTS 9,626,453 B2 *  4/2017  Koerner ............ G06F 17/30401
9,710,545 B2 *  7/2017  Mo .................... G06F 17/30684
(Continued)

*Primary Examiner* — Richard M Camby
(74) *Attorney, Agent, or Firm* — Blueshift IP, LLC; Robert Plotkin

(57) ABSTRACT

The present disclosure relates to products and services locating systems, and discloses an interactive system for locating products and services with voice/chat enabled assistance. It helps customers in identifying location and availability of products based on current inventory of stocks in various stores, and also helps customers in identifying location of different services and offers provided by different services providers. Further the system of the present disclosure provides navigation assistance based on user requirement. The system comprises a memory, a processor, a database, a user input module, a location identifier, a natural language processing (NLP) engine, and a server.

7 Claims, 2 Drawing Sheets

(56) References Cited

U.S. PATENT DOCUMENTS

Figure 1:
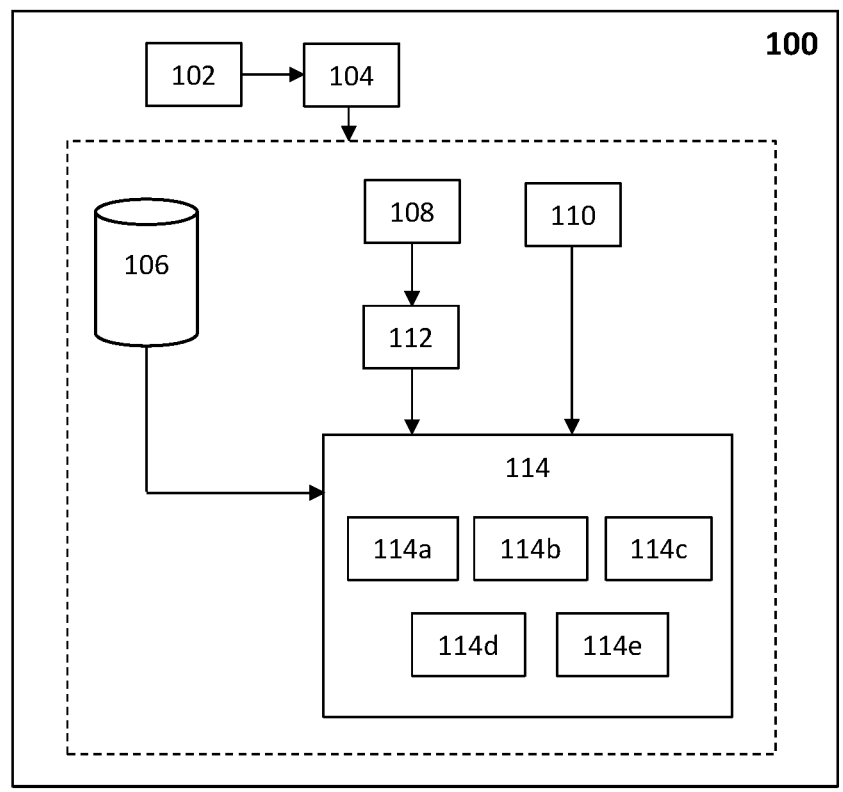

| | | | |
|---|---|---|---|
| 10,034,053 B1* | 7/2018 | Trollope | H04H 60/33 |
| 10,097,494 B2* | 10/2018 | Ban | G06F 17/3087 |
| 2018/0219969 A1* | 8/2018 | Filev | H04L 67/32 |
| 2018/0240211 A1* | 8/2018 | Chatterjee | G06Q 30/0261 |
| 2018/0359198 A1* | 12/2018 | Eidem | G06F 17/271 |

* cited by examiner

COMPUTER IMPLEMENTED INTERACTIVE SYSTEM AND METHOD FOR LOCATING PRODUCTS AND SERVICES

FIELD

The present disclosure relates to products and services locating systems.

DEFINITIONS OF TERMS USED IN THE SPECIFICATION

The expression 'user device' used hereinafter in the specification refers to but is not limited to a mobile phone, a cellphone, a laptop, a tablet, a desktop, an iPad, a PDA, a notebook, a net book, a smart device, a smart phone and the like, including a wired or a wireless computing device.

The expression 'product' used hereinafter in the specification refers to but is not limited to something that is made to be sold, usually something that is produced by an industrial process or, less commonly, something that is grown or obtained through farming.

The expression 'services' used hereinafter in the specification refers to but is not limited to an economic activity where an immaterial exchange of value occurs. Activities in the service sector include retail, banks, hotels, real estate, education, health, social work, computer services, recreation, media, communications, electricity, gas water supply and the like.

These definitions are in addition to those expressed in art.

BACKGROUND

Stores generally stock a large number of articles/products across different categories to provide customers with a wide variety of options at a single location. However, shopping in such stores can be time consuming due to the sheer size of these stores. Moreover, the shopping becomes difficult when the stores do not provide guiding maps/product placement guides. It can be a strenuous task for the customers to find a desired product/article, without the guiding map of the store, even when the article is available in the store. Sometimes, even the retailer/store owner is unaware of the location of an article which can lead to loss in sales.

Similarly, as there are numerous service providers providing wide variety of services, it is extremely difficult for customers to search for service providers that provide relevant and quality services. In some cases, it is virtually impossible for the customers to correctly identify a service provider best suited for their needs.

Therefore, there is provided herein a computer implemented interactive system and method for locating products and services, which limits abovementioned drawbacks.

OBJECTS

Some of the objects of the present claimed subject matter aimed to ameliorate one or more problems of the prior art or to at least provide a useful alternative are listed herein below.

An object of the present disclosure is to provide an interactive system for locating products and services.

Another object of the present disclosure is to provide an interactive system for locating products and services with voice/chat enabled assistance.

Yet another object of the present disclosure is to provide an interactive system for locating desired products, which helps customers in identifying location and availability of products based on current inventory of stocks in various stores.

Another object of the present disclosure is to provide an interactive system for locating desired services, which helps customers in identifying location of different services and offers provided by different services providers.

One another object of the present disclosure is to provide an interactive system for locating products and services, which also provides navigation assistance based on user requirement.

Other objects and advantages of the present disclosure will be more apparent from the following description when read in conjunction with the accompanying figures, which are not intended to limit the scope of the present disclosure.

SUMMARY

A computer implemented system for locating products and services is disclosed. The system comprises a memory, a processor, a database, a user input module, a location identifier, a natural language processing (NLP) engine, and a server. The memory stores a set of pre-determined rules. The processor generates a plurality of system processing commands based on the set of pre-determined rules. The database stores detailed information, related to a plurality of products and a plurality of services, including, category, availability and location of the respective products and service. The user input module accepts a query relating to at least one product and/or at least one service, from a user. The location identifier identifies user location of the user. The NLP cooperates with the user input module to receive the query, and analyzes the query to identify at least one user intent within the query to provide a structured output having the user intent. The server cooperates with the database, the NLP engine, and the location identifier. The server comprises a user repository, and a query handler. The user repository stores historical data related to queries and responses of a plurality of users in relation to a plurality of user intents. The query handler analyzes the stored historical data and the stored detailed information, in relation to the user intent and the user location to provide at least one recommendation, having information relating to the at least one product and/or at least one service present in the query, to the user.

The server further comprises a navigator, an updater, and a recommendation module. The navigator navigates the user based on the user location and the at least one recommendation. The updater is configured to associate the at least one recommendation to the user. The updater then updates the historical data in the user repository to include the at least one recommendation. The recommendation module provides personalized recommendations to the user based on a current query from the user and the stored historical data of the user.

In an embodiment, the query handler includes a comparator and extractor configured to compare the at least one recommendation with the stored detailed information from the database to extract similar information from the stored detailed information, and further configured to provide the similar information related to similar products and/or services based on the intent within the query, to the user.

Further, the system includes a display to display the at least one recommendation. The query and the recommendation is written and/or verbal. In another embodiment, the system users to create wish lists having queries related to a plurality of products and services desired by the users, wherein the navigator navigates the users through shortest routes based on recommendations provided for the queries in the wish lists. Furthermore, a user device is used by a user to provide the query and the user location.

A computer implemented method for locating products and services is also disclosed. The method comprises the following:

- storing, in a memory, a set of pre-determined rules;
- generating, by a processor, a plurality of system processing commands based on the set of pre-determined rules;
- storing, in a database, detailed information related to a plurality of products and a plurality of services, including, category, availability and location of the respective products and service;
- accepting, by a user input module, a query relating to at least one product and/or at least one service, from a user;
- identifying, by a location identifier, user location of the user;
- analyzing, by a natural language processing (NLP) engine, the query to identify at least one user intent within the query to provide a structured output having the user intent;
- storing, in a user repository of a server, historical data related to queries and responses of a plurality of users in relation to a plurality of user intents; and
- analyzing, by a query handler of the server, the stored historical data and the stored detailed information, in relation to the user intent and the user location to provide at least one recommendation, having information relating to the at least one product and/or at least one service present in the query, to the user.

The method further comprises the following:

- navigating, by a navigator, the user based on the user location and the at least one recommendation;
- associating the at least one recommendation to the user, and updating the historical data to include the at least one recommendation, in the user repository, by an updater; and
- providing, by a recommendation module, personalized recommendations to the user based on a current query from the user and the stored historical data of the user.

In one embodiment, the step of providing at least one recommendation further includes a step of comparing the at least one recommendation with the stored detailed information from the database to extract similar information from the stored detailed information, and providing the similar information related to similar products and/or services based on the intent within the query, to the user.

BRIEF DESCRIPTION OF THE ACCOMPANYING DRAWING

Figure 2:
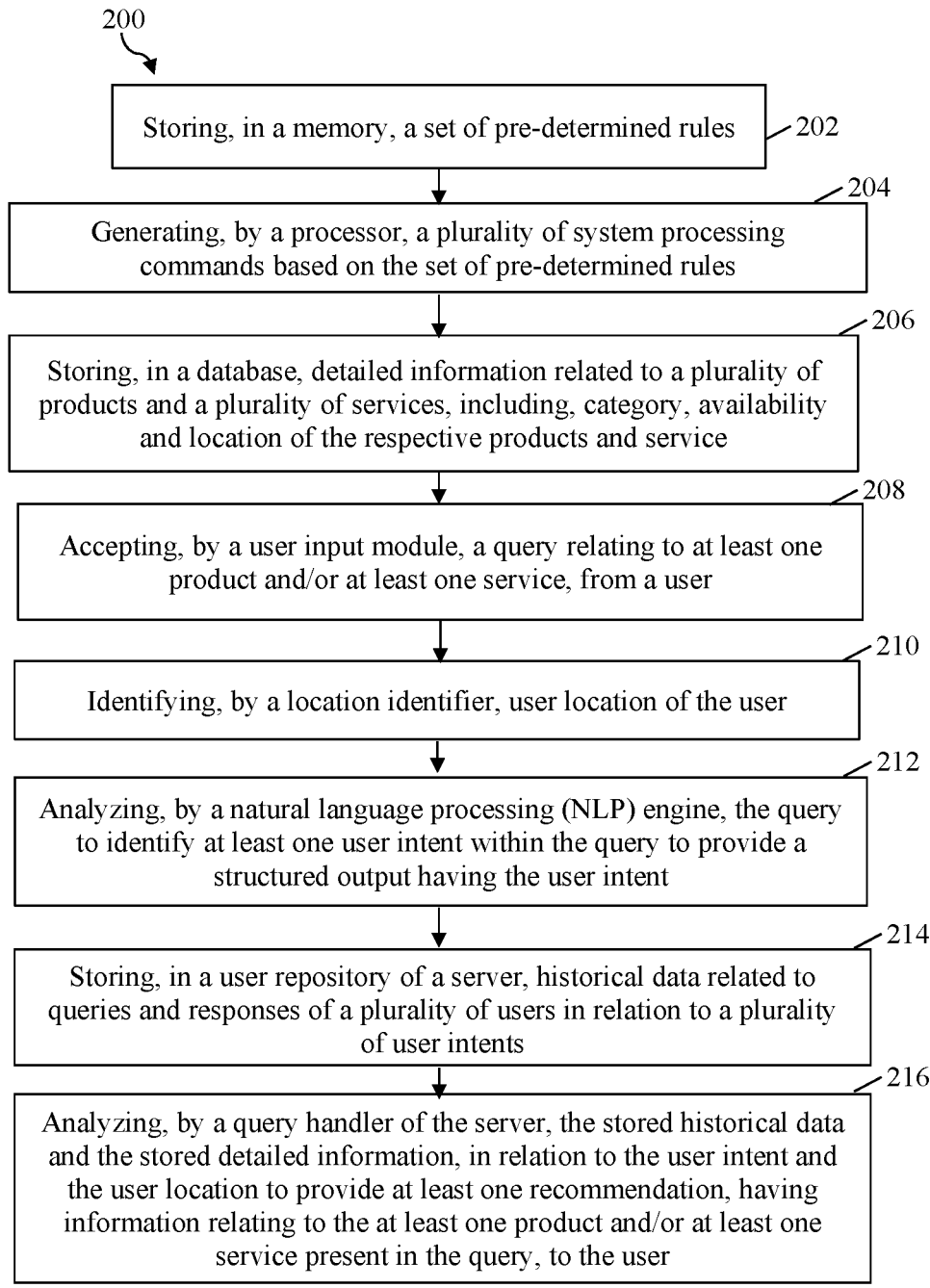

The computer implemented interactive system and method for locating products and services of the present disclosure will now be described with the help of the accompanying drawing, in which:

FIG. 1 illustrates a schematic block diagram of a computer implement interactive system for locating products and services, in accordance with one embodiment of the present disclosure; and FIG. 2 illustrates a flow diagram of a computer implement interactive method for locating products and services, in accordance with an embodiment of the present disclosure.

LIST AND DETAILS OF REFERENCE NUMERALS USED IN THE DESCRIPTION AND DRAWING

| Reference Numeral | Reference |
| --- | --- |
| 100 | Interactive system for locating products and services |
| 102 | Memory |
| 104 | Processor |
| 106 | Database |
| 108 | User input module |
| 110 | Location identifier |
| 112 | Natural language processing (NLP) engine |
| 114 | Server |
| 114a | User repository |
| 114b | Query handler |
| 114c | Navigator |
| 114d | Updater |
| 114e | Recommendation module |
| 200-216 | Method steps |

DETAILED DESCRIPTION

Stores generally stock a large number of articles/products across different categories to provide customers with a wide variety of options at a single location. However, shopping in such stores can be time consuming due to the sheer size of these stores. Moreover, the shopping becomes difficult when the stores do not provide guiding maps/product placement guides. It can be a strenuous task for the customers to find a desired product/article, without the guiding map of the store, even when the article is available in the store. Sometimes, even the retailer/store owner is unaware of the location of an article which can lead to loss in sales. Similarly, as there are numerous service providers providing wide variety of services, it is extremely difficult for customers to search for service providers that provide relevant and quality services. In some cases, it is virtually impossible for the customers to correctly identify a service provider best suited for their needs. Therefore, there is provided herein a computer implemented interactive system and method for locating products and services, which limits abovementioned drawbacks.

The computer implemented interactive system and method for locating products and services, as envisaged in the present disclosure is now described with the help of accompanying drawing. FIG. 1 illustrates a schematic block diagram of a computer implement interactive system for locating products and services (100) (hereinafter referred to as system), and FIG. 2 illustrates a flow diagram of a computer implement interactive method (200).

The system (100) comprises a memory (102), a processor (104), a database (106), a user input module (108), a location identifier (110), a natural language processing (NLP) engine (112), and a server (114).

The memory (102) is configured to store a set of pre-determined rules. The memory (102) may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes. In one embodiment, the memory (102) store pre-determined rules including rules related to storing type of information in the database, rules for accepting input from users, rules for comparing and extracting information, rules for analysis using the NLP engine, and the like.

The processor (104) is configured to generate a plurality of system processing commands based on the set of pre-determined rules. The processor (104) may be implemented as one or more microprocessors, microcomputers, microcontrollers, digital signal processors, central processing units, state machines, logic circuitries, and/or any devices that manipulate signals based on operational instructions. Among other capabilities, the processor (104) is configured to fetch and execute the set of pre-determined rules stored in the memory (102).

The database (106) is configured to store detailed information, related to a plurality of products and a plurality of services, including, category, availability and location of the respective products and service. In an embodiment, the detailed information related to a product includes the product details, product location, similar-products, product composition, product use, product number, number of products present in a store, and the like. Store details may also be included like store location, products present in the store and other store related information. The detailed information related to a service includes service details, service location, similar-services, service provider data including service provider details, service provider location, and other service related information. In one embodiment, product information is updated manually in the database (106). In another embodiment, the product information is updated dynamically using RFID tags attached with the products. In yet another embodiment, the database (106) is updated dynamically by integration with store transaction systems & location is updated dynamically in case of advance search based on RFID tags. Further, all products present in a store can be tagged with RFID tags which are coupled with barcodes. These RFID tags can serve as security tags or anti-theft tags to detect unauthorized movement of products. Further, the RFID tags can be used for identifying accurate location and exact quantity of the products present in a store. These details can be linked to the information in the database (106). This can help the store management to identify location of products that have been misplaced by the customers. In an embodiment, the system (100) can cooperate with the RFID tags to generate alert(s) for the misplaced products. Furthermore, based on the location information received by the RFID tags, the database (106) can be updated on a periodic basis.

The user input module (108) is configured to accept a query relating to at least one product and/or at least one service, from a user. In one embodiment, the user input module (108) receives the written or verbal query/input from a user. A user can use a user device (not shown in the figures) to input a query or record a query using the user device. In an embodiment, the user input module (108) is present in the user device. In another embodiment, the user input module (108) allows a user to input a list of products/services in which the user is interested. This list acts as a wish list of the user.

The location identifier (110) is configured to identify user location of the user. In one embodiment, the location identifier (110) is present in the user device. In another embodiment, the location identifier (110) is selected from a group of GLONASS, IRNASS, Galileo, BDS, GPS, and the like.

The NLP engine (112) is adapted to cooperate with the user input module (108) to receive the query, and is configured to analyze the query to identify at least one user intent within the query to provide a structured output having the user intent. The structured output is a machine language output. The NLP engine (112) classifies the generated machine language output into a structured data with an identified intent. For example, if the user input is "find location of a grocery store", the intent/objective of the user is to identify a grocery store which is nearest to the user. In an embodiment, the NLP engine (112) can be configured at the server (114).

The server (114) is adapted to cooperate with the database (106), the NLP engine (112), and the location identifier (110). The server (114) comprises a user repository (114a), and a query handler (114b).

The user repository (114a) is configured to store historical data related to queries and responses of a plurality of users in relation to a plurality of user intents. In one embodiment, user repository (114a) stores user search history including:
frequency of products/services searched;
frequency of user inputs; and
frequency of the time.

The query handler (114b) is configured to analyze the stored historical data and the stored detailed information, in relation to the user intent and the user location to provide at least one recommendation/answer, having information relating to the at least one product and/or at least one service present in the query, to the user. In one embodiment, the recommendation may be voice and/or text based. In yet another embodiment the query handler (114b) uses AI (Artificial Intelligence) enabled middleware for performing various computations. In another embodiment, the query handler (114b) uses third party AI services. In a further embodiment, the query handler (114b) uses machine learning techniques to learn and provide most relevant results to the users based on the previous user queries and/or user history. In yet another embodiment, the system (100) uses the machine learning technique to build a user persona based on which user are offered personalized recommendations.

Further, the query handler (114b) includes a comparator and extractor configured to compare the at least one recommendation with the stored detailed information from the database (106) to extract similar information from the stored detailed information. The comparator and extractor is further configured to provide the similar information related to similar products and/or services based on the intent within the query, to the user. In one embodiment, the comparator and extractor compares the price, product/service details, location of the user with respect to product/service location, to provide similar and relevant recommendations. In an embodiment, the system (100) includes a display configured to display the recommendations.

The server (114) also comprises a navigator (114c), an updater (114d), and a recommendation module (114e). The navigator (114c) is configured to navigate the user based on the user location and the at least one recommendation. The navigator (114c) cooperates with the database (106) and the location identifier (110) to receive the product location, the store location, service provider location and the current position of the user respectively and is further configured to provide navigation assistance to the user. In an embodiment, the navigator (114c) provides the assistance to the user for reaching the store/service provider location. In another embodiment, the navigator (114c) provides assistance to the user to reach to the desired product within a store. In yet another embodiment, the assistance can be provided based on voice and/or text services. In a further embodiment, the navigator (114c) generates a shortest route from the user location to product/service location based on user request/query and cooperates with the display to display the shortest route for navigating the user. The shortest route is created based on a current location of the user and the store/service provider location, and product location stored in the database (106).

In an embodiment, the navigator (114c) creates a shortest route for the wish list created by the user. The system (100) creates & updates a location map based on current user location & shortest route & present personalized offers to the user as he/she moves.

The updater (114d) is configured to associate the at least one recommendation to the user and update the historical data to include the at least one recommendation, in the user repository (114a).

The recommendation module (114e) is configured to provide personalized recommendations to the user based on a current query from the user and the stored historical data of the user. In an embodiment, the recommendation module (114e) recommends products/services similar to enquired product/services, in case the product/service which is enquired is out of stock. In another embodiment, the recommendation module (114e) provides insights to service providers/retailers based on a user's search history. In a working example, if 'n' numbers of customers are searching for a 'xyz' product in a particular area, the recommendation module (114e) recommends the retailer to keep at least 'n' number of products in stock. In one embodiment, the recommendation may be voice and/or text based. The recommendation module (114e) may display the recommendation on the display. In one embodiment, the recommendation module (114e) displays offers to users based on the user location, route taken by the user and proximity to different products/services. In another embodiment, the system (100) creates a user persona for every user and stores it in the user repository (114a). This user persona is then used to sort and provide the offers. The offers can include offer given by stores/services as well as offers provided by the product companies.

In an exemplary embodiment, when a user provides an input "buy car shampoo" to the user input module (108), the NLP engine (112) analyzes this input and generates corresponding structured output. The location identifier (110) identifies current location of the user. The current location of the user and the generated structured output is provided to the server (114). The query handler (114b) receives the generated structured output (query) and cooperates with the database (106) to receive product data and/or store data based on the query. The query handler (114b) further analyzes the product data and/or the store data with respect to the query and the location of the user, and the historical data of the user from the user repository (114a), and provides the store location and/or the product location as an answer/response to the query/user input. Using the navigator (114c) the user can then reach to the store and/or to the location of the desired product. Similarly, based on the answer/response user can decide the services that need to be availed.

In an embodiment, the system (100) can also be hosted using Chat Bots, which makes the system (100), platform independent i.e. it can be used on any messaging platform, webpage, mobile application and/or embedded application.

The present disclosure also discloses a computer implemented interactive method (200) for locating products and services. The method comprises the following steps:
storing, in a memory, a set of pre-determined rules; (step 202)
generating, by a processor, a plurality of system processing commands based on the set of pre-determined rules; (step 204)
storing, in a database, detailed information related to a plurality of products and a plurality of services, including, category, availability and location of the respective products and service; (step 206)
accepting, by a user input module, a query relating to at least one product and/or at least one service, from a user; (step 208)
identifying, by a location identifier, user location of the user; (step 210)
analyzing, by a natural language processing (NLP) engine, the query to identify at least one user intent within the query to provide a structured output having the user intent; (step 212)
storing, in a user repository of a server, historical data related to queries and responses of a plurality of users in relation to a plurality of user intents; (step 214) and
analyzing, by a query handler of the server, the stored historical data and the stored detailed information, in relation to the user intent and the user location to provide at least one recommendation, having information relating to the at least one product and/or at least one service present in the query, to the user. (step 216).

The method (200) further comprises the following:
navigating, by a navigator, the user based on the user location and the at least one recommendation;
associating the at least one recommendation to the user, and updating the historical data to include the at least one recommendation, in the user repository, by an updater; and
providing, by a recommendation module, personalized recommendations to the user based on a current query from the user and the stored historical data of the user.

Further, the step of providing at least one recommendation (216) further includes a step of comparing the at least one recommendation with the stored detailed information from the database to extract similar information from the stored detailed information, and providing the similar information related to similar products and/or services based on the intent within the query, to the user.

TECHNICAL ADVANCEMENTS

The present disclosure described herein above has several technical advantages including, but not limited to, the realization of a computer implemented interactive system for locating products and services, that:
provides voice/chat enabled assistance;
helps customers in identifying the location and availability of products based on the current inventory of stocks in various stores;
helps customers in identifying location of different services and offers provided by different services providers; and
provides navigation assistance to a user in need of such assistance.

The embodiments hereinabove and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The use of the expression "at least" or "at least one" suggests the use of one or more elements or ingredients or quantities, as the use may be in the embodiment of the disclosure to achieve one or more of the desired objects or results.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented interactive system for locating products and services, said system comprising:
    a memory configured to store a set of pre-determined rules;
    a processor configured to generate a plurality of system processing commands based on said set of pre-determined rules;
    a database configured to store detailed information, related to a plurality of products and a plurality of services, including, category, availability and location of said respective products and service;
    a user input module configured to accept a query relating to at least one product and/or at least one service, from a user;
    a location identifier configured to identify user location of said user;
    a natural language processing (NLP) engine adapted to cooperate with said user input module to receive said query, and configured to analyze said query to identify at least one user intent within said query to provide a structured output having said user intent; and
    a server adapted to cooperate with said database (106), said NLP engine, and said location identifier, said server comprising:
        a user repository configured to store historical data related to queries and responses of a plurality of users in relation to a plurality of user intents;
        a query handler configured to analyze said stored historical data and said stored detailed information, in relation to said user intent and said user location to provide at least one recommendation, having information relating to said at least one product and/or at least one service present in said query, to said user;
        a navigator configured to navigate said user based on said user location and said at least one recommendation;
        an updater configured to associate said at least one recommendation to said user and update said historical data to include said at least one recommendation, in said user repository; and
        a recommendation module configured to provide personalized recommendations to said user based on a current query from said user and the stored historical data of said user;
    wherein said system facilitates users to create wish lists having queries related to a plurality of products and services desired by the users, wherein said navigator navigates said users through shortest routes based on recommendations provided for the queries in said wish lists.

2. The system as claimed in claim 1, wherein said query handler includes a comparator and extractor configured to compare said at least one recommendation with said stored detailed information from said database to extract similar information from said stored detailed information, and further configured to provide said similar information related to similar products and/or services based on the intent within said query, to said user.

3. The system as claimed in claim 1, which includes a display configured to display said at least one recommendation.

4. The system as claimed in claim 1, wherein said query and said recommendation is written and/or verbal.

5. The system as claimed in claim 1, wherein a user device is used by a user to provide said query and said user location.

6. A computer implemented interactive method for locating products and services, said method comprising the following:
    storing, in a memory, a set of pre-determined rules;
    generating, by a processor, a plurality of system processing commands based on said set of pre-determined rules;
    storing, in a database, detailed information related to a plurality of products and a plurality of services, including, category, availability and location of said respective products and service;
    accepting, by a user input module, a query relating to at least one product and/or at least one service, from a user;
    identifying, by a location identifier, user location of said user;
    analyzing, by a natural language processing (NLP) engine, said query to identify at least one user intent within said query to provide a structured output having said user intent;
    storing, in a user repository of a server, historical data related to queries and responses of a plurality of users in relation to a plurality of user intents;
    analyzing, by a query handler of said server, said stored historical data and said stored detailed information, in relation to said user intent and said user location to provide at least one recommendation, having information relating to said at least one product and/or at least one service present in said query, to said user;
    creating wish list having queries related to a plurality of products and services desired by the users;
    navigating, by a navigator, said user through shortest route based on said user location and said at least one recommendation provided for the queries in the wish list;
    associating said at least one recommendation to said user, and updating said historical data to include said at least one recommendation, in said user repository, by an updater; and providing, by a recommendation module, personalized recommendations to said user based on a current query from said user and the stored historical data of said user.

7. The method as claimed in claim 6, wherein said step of providing at least one recommendation further includes a step of comparing said at least one recommendation with said stored detailed information from said database to extract similar information from said stored detailed information, and providing said similar information related to similar products and/or services based on the intent within said query, to said user.

\* \* \* \* \*